United States Patent [19]

Cesano

[11] Patent Number: 4,692,108
[45] Date of Patent: Sep. 8, 1987

[54] MOLD FOR THE COVERING AND TRIMMING OF PRODUCTS OF PLASTICS MATERIAL

[75] Inventor: Franco Cesano, S. Secondo di Pinerolo, Italy

[73] Assignee: G.O.R. Applicazioni Speciali S.p.A., Turin, Italy

[21] Appl. No.: 842,250

[22] Filed: Mar. 21, 1986

[30] Foreign Application Priority Data

Jul. 31, 1985 [IT] Italy ................................ 12550 A/85

[51] Int. Cl.$^4$ ............................................. B29C 51/32
[52] U.S. Cl. .................................. 425/292; 264/163;
425/301; 425/306; 425/423
[58] Field of Search ............... 425/292, 415, 423, 301,
425/306; 83/618–621; 156/267, 511, 530;
264/163

[56] References Cited

U.S. PATENT DOCUMENTS

| | | | |
|---|---|---|---|
| 3,546,740 | 12/1970 | Johnson | 425/292 X |
| 3,663,522 | 5/1972 | Butcher | 264/163 X |
| 3,699,201 | 10/1972 | Turner | 264/163 X |
| 3,755,522 | 8/1973 | Jope et al. | 425/292 X |
| 3,918,871 | 11/1975 | Anderson et al. | 425/292 |
| 3,989,581 | 11/1976 | Kober et al. | 264/163 X |
| 4,104,349 | 8/1978 | Hillgenberg | 264/163 X |
| 4,243,456 | 1/1981 | Cesano | 264/163 X |

FOREIGN PATENT DOCUMENTS 2833578 2/1980 Fed. Rep. of Germany ...... 425/292

Primary Examiner—Richard L. Chiesa
Attorney, Agent, or Firm—Larson and Taylor

[57] ABSTRACT

This invention relates to a mold for the covering and trimming of plastics products, particularly of panels for the inside upholstery of motor vehicles. The object of the invention is to avoid that the covering material (4), spread over a heated sheet of plastics material intended to constitute the product (3) to be covered, may be pinched between two side knives (8) associated with two substantially rectilinear sides of the outline of the product (3) and converging to each other toward a preferably rounded corner of said product (3). To achieve this object, at the angle between the two side knives (8) associated with the converging substantially rectilinear sides, there is arranged a knife (8') which is shaped correspondingly to said corner, and the ends of which slidably engage the outer planar surfaces of tapered end extensions (108) of the side knives (8). Means (9, 9', 10, 10') are provided for displacing simultaneously the side knives (8) and interposed shaped knife (8'). The sliding surfaces between the extensions (108) of the side knives (8) and interposed shaped knife (8') are at such an angle to the directions of movement of either the two side knives (8) and the interposed shaped knife (8') as to always remain in contact with each other during the movement of said knives.

5 Claims, 11 Drawing Figures

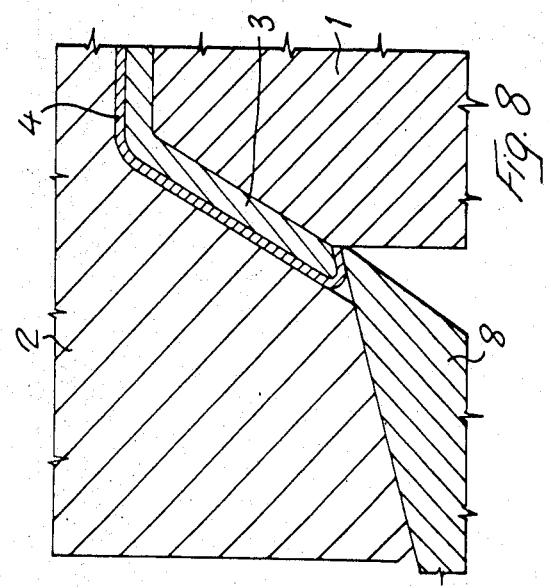
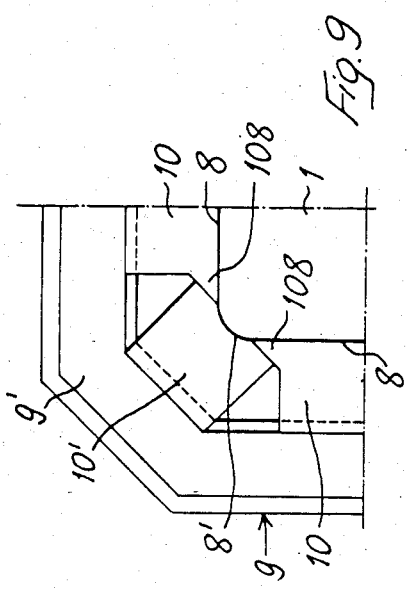
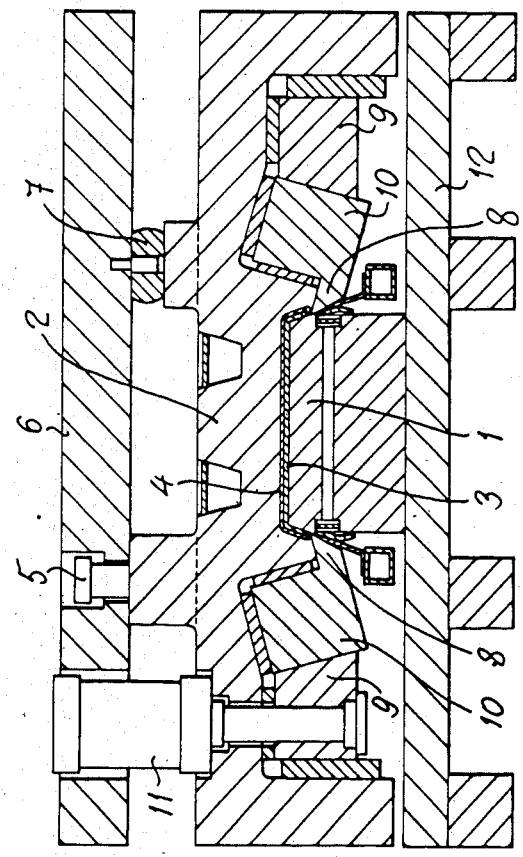
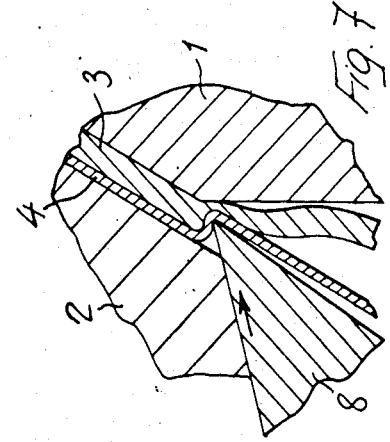

MOLD FOR THE COVERING AND TRIMMING OF PRODUCTS OF PLASTICS MATERIAL

BACKGROUND AND SUMMARY OF THE INVENTION

This invention relates to the thermoforming molds for the heat-promoted application of a covering on a plastics product formed by said molds and for the trimming, on completion of said application, of said product along at least a portion of its perimeter.

The molds of this type comprise a male element whereon a heated sheet constituting the product to be covered is disposed, and means to spread said covering material on the sheet disposed on the male element, and a female element adapted to be pressed against said male element while said sheet to be covered and said covering material thereon are interposed therebetween. Arranged on at least a portion of the perimeter of said male element there are trimming knives which are movable transversely to said male element and are adapted to cut both said product and its covering along pre-established edges and when said mold is closed.

The molds of the type described above may be used with any material to be covered and any covering material. The material to be covered may be formed of a sheet of any substantially rigid and heat-formable (i.e., thermoplastic) material, e.g. polyolefines, or acrylonitrile, butadiene and styrene copolymers, possibly containing any filling organic or inorganic material. In particular, the material to be covered may be formed of polyolefines filled with cellulose fibers, e.g. sawdust, as described in the German Pat. No. 2.412.538 published on Oct. 31, 1974. The product to be covered may present any shape and peripheral outline, and it may be intended for any purpose or use. In particular, the mold according to the invention may be used for manufacturing internal upholstery panels for motor vehicles or any other similar panels, having an at least slightly concave and/or convex configuration. The covering material may be formed of any material which is compatible with the product to be covered and which may be secured, specifically heat-secured, thereto. In particular, the covering material may be formed of plastics sheets, e.g. PVC, textile cloths, woven or non-woven or knitted fabrics either of natural and/or synthetic fibers, which may be plasticized, specifically, with vinyl resins.

In the heretofore known molds of the type mentioned above, the product is trimmed at a preferably rounded corner or at a curved connection between two substantially rectilinear sides of the outline of said product, by means of corresponding curved and complementary end portions of two side knives associated with said rectilinear sides. However, the disadvantage of this system is that in the opened position of said knives associated with the two substantially rectilinear sides of the outline of said product, an interstice is formed between the adjacent and co-operating ends of said knives, in the opened condition thereof, at the corner or radiused corner between said rectilinear sides, and that the covering material may find its way thereinto and be pinched and squeezed between the co-operating ends of said knives when they close, i.e., when they move toward the respective rectilinear sides of the outline of the product, thus forming undesired laps or tabs at the corner or radius between said rectilinear sides.

The invention aims to eliminate this disadvantage and, to achieve this object, it is characterized in that—at least at a preferably rounded corner or curved radius between two rectilinear or substantially rectilinear sides of the outline of the product—a knife, shaped correspondingly to said corner or radius and comprising end portions slidably engaging outer planar surfaces of pointed or tapered end extensions of said side knives, is arranged between the side knives associated with said rectilinear sides, means being provided to move simultaneously the side knives and interposed knife, while the sliding surfaces between the extensions of the side knives and interposed shaped knife are at such an angle to the directions of movement of the two side knives and interposed shaped knife as to constantly keep in contact with each other during the movement of said knives.

It is now apparent that in this embodiment of the mold, no interstice is formed at the corner or radius between two substantially rectilinear portions of the outline of said product when the trimming knives are opened, i.e., retracted from the male element of the mold, because between the two side knives associated with said rectilinear sides there is arranged the shaped knife associated with said corner or radius. By extending the shaped knife behind the tapered end extensions of the two side knives and by slidingly associating said shaped knife and said extensions of the two side knives along contacting surfaces at an angle to the direction of movement of the knives, there is avoided the formation of open interstices between the two side knives and interposed shaped knife. Therefore, the covering material cannot be pinched between the trimming knives when they close against the male element of the mold.

Preferably, according to a further characteristic of the invention, which may be used alone or in combination with the characteristics set forth above, the trimming knives are movable in planes that are inclined to the surface of the covered product, and usually inclined upwardly towards the inner region of the male element of the mold, at an angle of about 0° to 15° to the horizontal, so as to fold the covering material on the trimmed edge of the underlying product, i.e. to cover said trimmed edge of the product at least partially with covering material. By this arrangement, the trimmed edges of the covered product will be completely finished and the product is ready to be used with no further finishing or covering of its edges.

BRIEF DESCRIPTION OF THE DRAWINGS

These and other characteristics of the invention and the advantages resulting therefrom will be more apparent from the following description of a preferred embodiment thereof, which is shown in the accompanying drawings, in which:

FIGS. 6 is a vertical sectional view of the mold of the FIGS. 1 to 3, in the trimming step thereof;

FIGS. 7 and 8 are sectional views, on a larger scale, of a detail of the mold in two successive trimming positions, corresponding to the step shown in FIG. 6;

FIG. 9 is a plan view of the trimming knives of FIG. 5 in their final cutting position, i.e. their most advanced position toward the male element of the mold, corresponding to the step shown in FIG. 6;

DESCRIPTION OF THE PREFERRED EMBODIMENT

Figure 1:
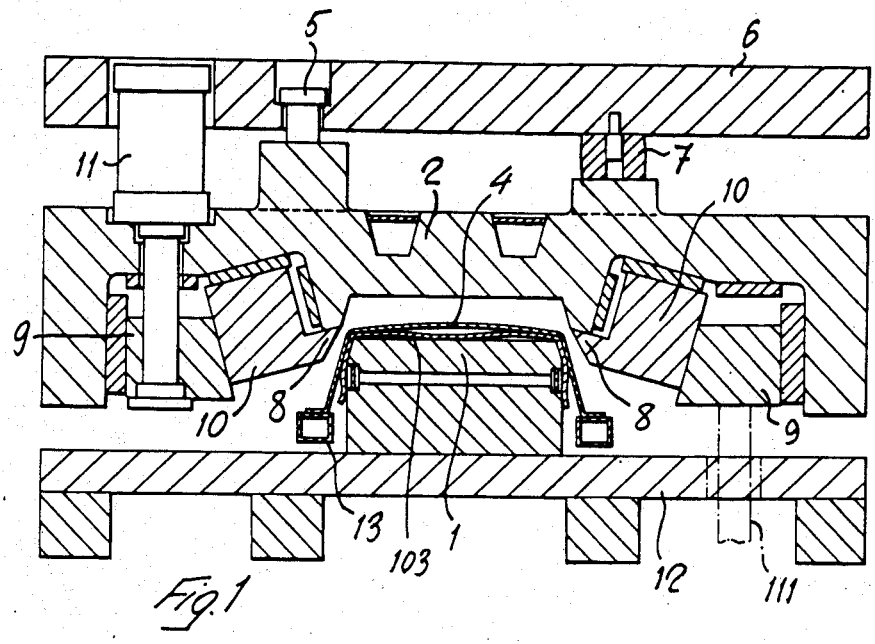
FIG. 1 is a vertical sectional view of a mold according to the invention, in an initial step of its working cycle.

With reference to the drawings, the mold according to the invention comprises a male element 1 secured on a support member 12, and an overlying female element, both shaped to form a product 3 of plastics material by a thermoforming process, a covering 4 being simultaneously heat-secured to said product. The product 3 may be constituted, for example, by a shaped panel made of plastics containing cellulose fibers or sawdust as filling material and intended to constitute an element of the internal upholstery of motor vehicles. The covering material 4 may be formed, for example, a fabic or a sheet of plastics.

The female element 2 of the mold is suspended, for example, by means of enlarged-heat bolts 5, from an overhead support 6 and it may move vertically to a limited extent with respect to said support. Arranged between the female element 2 and support 6 are compression spring members 7, for example, made of rubber.

Trimming knives 8, 8' are arranged in the female element 2 all around the male element 1 and co-operate with the latter as if it were a counter-knife. The trimming knives 8, 8' are slidably guided transversely to the male element 1 of the mold, from a rest position—spaced from the male element 1 and shown in FIGS. 1, 3, 4 and 5—to a cutting position extended toward the male element 1 and shown in FIGS. 6, 8 and 9. The movement of the trimming knives 8, 8' is obtained by means of a ring 9 having a wedge-shaped section and extending all around the trimming knives 8, 8', said ring being slidably guided vertically in the female element 2 of the mold. The trimming knives 8, 8' are carried by slides 10, 10' which are slidable in the female element 2 either horizontally or (as in the illustrated embodiment) in a direction at an angle of 0°-15° to the horizontal, upwardly towards the central region of the male element 1 of the mold. The outer sides of the knife-carrying slides 10, 10' engage the inclined inner edge of said ring 9. In order to ensure a strictly synchronous movement of all the trimming knives 8, 8', said ring 9 is made either of a single member or of rigidly connected members. The vertical movement of the ring 9 may be effected, for example, by actuating cylinders 11, either of the hydraulic or pneumatic type, fixed to the female element 2 and extending freely upwards through corresponding openings in the support 6.

In a modified embodiment, the vertical movement of the ring 9 may be effected by means of rods 111 freely passed upwards through the support 12, as shown with dot-and-dash lines in the right-hand portion of FIG. 1. Said rods 111 may be actuated by any suitable means, for example by a blank holder which is movable on the lower portion of the press associated with said mold.

Figures 5, 11:
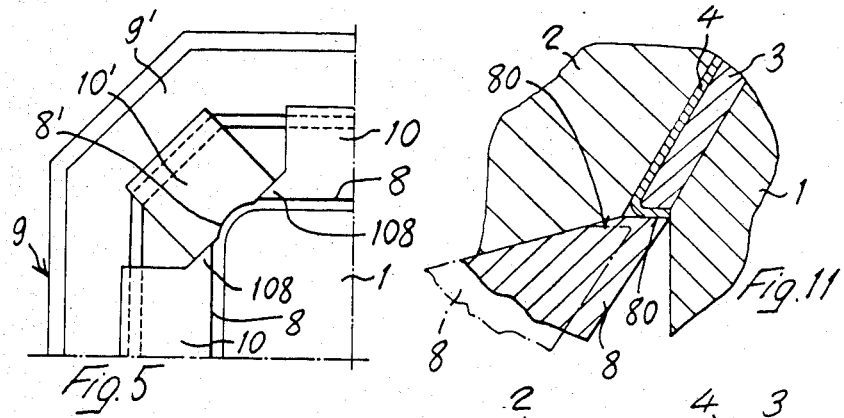
FIG. 5 is a diagrammatic plan view of the trimming knives at a corner of the mold, when they are retracted from the male element of the mold, i.e. in the position corresponding to the steps of FIGS. 1 to 4.
FIG. 11 is a fragmentary sectional view, similar to FIGS. 7 and 8, of a modified embodiment of the cutting edge of the trimming knives.
Figure 4:
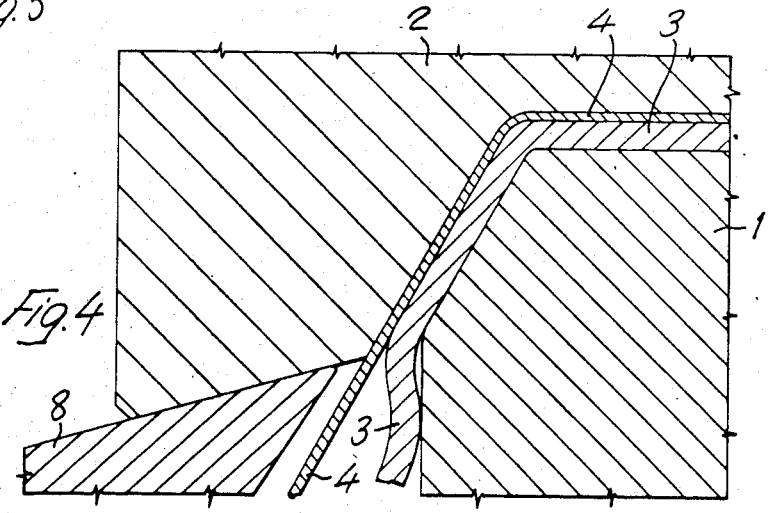
FIG. 4 is a sectional view, on a larger scale, of a detail of FIG. 3.

FIGS. 5 and 9 are plan views showing the construction of the trimming knives at each rounded corner of a panel 3 to be covered. According to this embodiment, each of the rectilinear or substantially rectilinear sides of the peripheral outline of the panel 3, which merge with each other at the rounded corner, has associated therewith a corresponding rectilinear or substantially rectilinear side trimming knife 8 which is integral with a respective slide 10. The rounded corner of the panel 3 has associated therewith a corresponding curved trimming knife 8' which is integral with a slide 10'. The side knives 8 and respective slides 10 are movably guided normally to the corresponding rectilinear or substantially rectilinear sides of the outline of the panel 3 and are driven by the corresponding rectilinear sides of the ring 9 with wedge cross section. The curved knife 8' at the corner and the respective slide 10' are so guided as to be substantially movable in the same direction as the bisector of said corner, and their movement is controlled by a corresponding side 9' of the ring 9, extending normally to the bisector of the corner.

Figure 10:
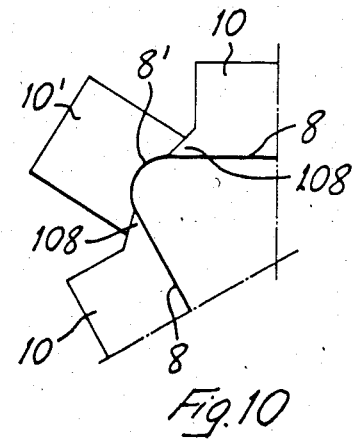
FIG. 10 is a diagrammatic plan view of the trimming knives at a corner different from that of FIGS. 5 and 9.

When seen in plan view, each of the two side knives 8 shows at the ends thereof a tapered or pointed extension 108 directed toward said corner, and said curved knife 8' slidably engages on the planar outer surface thereof through corresponding planar contact surfaces. In FIGS. 5 and 9, the rounded corner of the panel 3 is 90°, whereby the slidably contacting planar surfaces between the curved knife 8' and tapered extensions 108 of the two side knives 8 are co-planar with each other and are normal to the bisector of the corner. However, this requirement is not always necessary. In fact, the angle between the two rectilinear or substantially rectilinear sides of the outline of the panel 3 may have any value and may be, for example, less than 90°, as shown in FIG. 10. In the latter case, the slidably contacting planar surfaces between the curved knife 8' and the tapered extensions 108 of the two side knives 8 are at an angle to each other as shown in FIG. 10. The arrangement of the trimming knives 8, 8', 8 at a preferably rounded angle or at any curved radius between two rectilinear or substantially rectilinear sides of the outline of the panel 3 may be either symmetrical or asymmetrical to the bisector of the angle or to the curved outline of the radius.

The support members 12 and 6 of the male element 1 and female element 2, respectively, are relatively movable, either vertically and/or horizontally so as to operate as follows.

Figure 2:
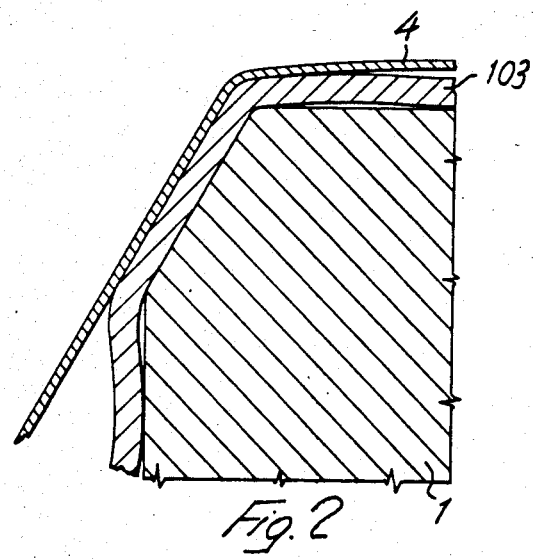
FIG. 2 is a sectional view, on a larger scale, of a detail of FIG. 1.

A plastics sheet 103 intended to form the panel 3 to be covered is suitably heated previously and is disposed on the male element 1. Said heated sheet 103 is then covered with the covering material 4 spread on a suitable frame 13, as shown in FIG. 1. In this initial step, the covering material 4 spread on the sheet 103 intended to form the panel 3 to be covered is not entirely in contact with said sheet 103, nor the latter entirely contacts the mold 1, as shown diagrammatically in FIG. 2.

Figure 3:
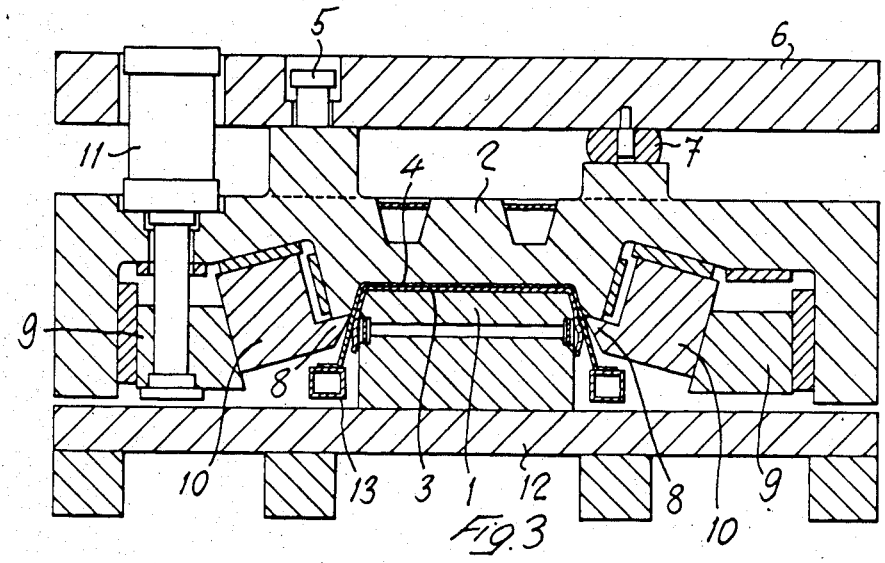
FIG. 3 is a sectional view similar to FIG. 1, showing the mold in the closed condition thereof.

The female element 2 of the mold is then closed against the male element 1, for example, by lowering the support 6 to a suitable stop member so as to compress the springs 7, as shown in FIG. 3. The covering material 4 is thus compressed against the sheet 103, and therefore on the panel 3 formed thereby, and caused to adhere entirely and uniformly thereto, as shown on a larger scale in FIG. 4. During this step, the trimming knives 8, 8' are away from the male element 1 of the mold and are in the rest position, as shown in the FIGS. 3, 4 and 5.

During the successive operative step, the actuating cylinders 11 are activated and, when the mold is closed, said cylinders displace said ring 9 in such a direction (upwardly in FIGS. 1, 3 and 6) as to push all the trimming knives 8, 8' from their retracted rest position simultaneously toward the male element 1. The trimming knives 8, 8' will slide upward in said direction at an angle to the horizontal and will reach first said covering material 4 making it penetrate first said panel 3, as shown in FIG. 7, and then making it cut both the covering material 4 and panel 3, as shown in FIG. 8. By this arrangement, simultaneously with the trimming of the edges of the panel 3, the covering material is folded over so as to cover the edges of said panel 3, as shown in FIG. 8. As a result, the covered panel 3 may be used with no further finishing or covering of its trimmed edges.

During the cutting operation, the curved knife 8' at a corner moves simultaneously with the two adjoining side knives 8 toward the male element 1 of the mold, while keeping in contact with the outer planar surfaces of the tapered extensions of the side knives 8 and while sliding on said surfaces, as seen clearly on comparing the FIGS. 5 and 9. As a result, no interstice is formed between the two rectilinear or substantially rectilinear side knives 8 and the curved corner knife 8', thus avoiding pinching the covering material 4 extending all around the male element 1 of the mold between the latter and the frame 13.

In the embodiment of the FIGS. 1 to 10, the upper surface of the trimming knives 8, 8' is parallel to the inclined path of travel of said knives, at least in the region of their cutting edges and as far as to said cutting edges. In the modified embodiment of FIG. 11, however, the upper surface of the trimming knives terminates, at the cutting edges of said knives 8, 8', in a region 80 inclined at an angle smaller than that of the path of travel of the knives. Thus, for example, when the path of travel of the knives is at an angle of about 15° to the horizontal, the end region 80 of the upper surface of the trimming knives 8, 8' may be at an angle of 7°-9° to the horizontal. Anyway, during the cutting operation, the end region 80 of the upper surface of the trimming knives, being at an angle smaller than that of the path of travel of said trimming knives, exerts an upwardly directed pressure against the portion of the covering material 4 which is folded over the edges of the panel 3, so as to make said folded over portion of the covering material 4 adhere against the edges of said panel 3 more strictly, reliably and uniformly.

On the other side, though it is preferred that the movement of the knives occurs in a more or less upwardly inclined direction, in certain cases it may be desired or at least acceptable a substantially horizontal movement of the trimming knives since in this instance the actuating means for said knives are simplified.

I claim:

1. A molding apparatus for the production of a shaped laminate having a thermoplastic substrate and a covering material of a flexible sheet material adhering on said substrate, said apparatus comprising:
    a male mold member and a female mold member;
    each of said mold members having a molding surface and a perimeter corresponding to the desired outline of the substrate;
    said mold members being movable in a reciprocating manner relative to each other between a first position wherein the mold members are spaced apart and a second position wherein said molding surfaces are near each other and define a mold substantially corresponding to said shaped laminate;
    at least three trimming knives, each of said trimming knives, having a cutting edge located adjacent the perimeter of said male member, said trimming knives being movable substantially transversely to said male member and being adapted to cut both the substrate and the covering material along preestablished edges when said male and female members are in said second position;
    said trimming knives including at least two rectilinear side knives associated with rectilinear sides of the perimeter of said male member and at least one shaped knife having a cutting edge corresponding to curved or corner sections of the perimeter of said male member;
    said side knives each having planar tapered end extensions and said shaped knife having end portions being slidably engageable with said extensions as said trimming knives are moved substantially transversely to said male member; and
    means for simultaneously moving said side knives and said shaped knife substantially transversely to said male member.

2. A molding apparatus as claimed in claim 1 wherein said means for simultaneously moving said side knives and shaped knife transversely to said male member comprises:
    a single wedge-shaped member being movable substantially perpendicularly to the plane of said knives having a surface which is perpendicular to the direction of movement of said knives.

3. A molding apparatus claimed in claim 1 wherein said means for simultaneously moving said side knives and said shaped knife transversely to said male member comprises:
    a single annular wedge-shaped member movable substantially perpendicularly to the plane of said knives,
    and slides attached to said trimming knives having a surface slidably engaged with said wedge-shaped member such that movement of said wedge-shaped member substantially perpendicularly to the plane of said knives causes said knives to simultaneously move substantially transversely to said male mold member.

4. A molding apparatus as claimed in claim 1 wherein said trimming knives are movable in a plane inclined at an angle of up to 15° from a plane defined by said molding surface towards said female member in such a manner as to fold the covering material over the trimmed edge of the substrate.

5. A molding apparatus as claimed in claim 1 wherein the cutting edge of said trimming knives is inclined out of the plane of movement of said trimming knives so as to exert a pressure on said covering material directed towards said female member.

* * * * *